(12) United States Patent
Mori et al.

(10) Patent No.: US 11,726,040 B2
(45) Date of Patent: Aug. 15, 2023

(54) DETECTING APPARATUS

(71) Applicant: DISCO CORPORATION, Tokyo (JP)

(72) Inventors: Kazuki Mori, Tokyo (JP); Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/649,714

(22) Filed: Feb. 2, 2022

(65) Prior Publication Data

US 2022/0268700 A1  Aug. 25, 2022

(30) Foreign Application Priority Data

Feb. 19, 2021  (JP) .................................. 2021-025026

(51) Int. Cl.
*G01N 21/64* (2006.01)

(52) U.S. Cl.
CPC ... *G01N 21/643* (2013.01); *G01N 2021/6471* (2013.01)

(58) Field of Classification Search
CPC ......... G01N 21/643; G01N 2021/6471; G01N 21/645; G01N 2021/646; G01N 2021/6463; G01N 2021/6469; G01N 21/6489; G01N 21/8806; G01N 21/314; G01N 21/3563; G01N 21/64; G01N 21/8851; G01N 2021/3568; G01N 2021/8845

See application file for complete search history.

(56) References Cited

U.S. PATENT DOCUMENTS

| | | | |
|---|---|---|---|
| 2010/0235114 A1* | 9/2010 | Levy ................. | G01N 21/9505 702/42 |
| 2014/0246398 A1* | 9/2014 | Zaghib .................. | H01M 4/583 216/13 |
| 2020/0150038 A1* | 5/2020 | Ito ....................... | G01N 21/6489 |
| 2022/0266393 A1* | 8/2022 | Mori .................. | B23K 26/0853 |
| 2022/0395931 A1* | 12/2022 | Nomoto ............ | B23K 26/0853 |
| 2022/0410305 A1* | 12/2022 | Genda ............... | G01N 21/6489 |

FOREIGN PATENT DOCUMENTS

| | | |
|---|---|---|
| JP | 2016111143 A | 6/2016 |
| JP | 2020077783 A | 5/2020 |

\* cited by examiner

*Primary Examiner* — David P Porta
*Assistant Examiner* — Gisselle M Gutierrez
(74) *Attorney, Agent, or Firm* — Greer, Burns & Crain, Ltd.

(57) ABSTRACT

A detecting apparatus for use in specifying regions having different impurity concentrations in an ingot includes an ingot holding unit having a holding surface for holding the ingot thereon, an excitation light source for applying excitation light having a predetermined wavelength to a face side of the ingot held on the holding surface, and a photodetector for detecting fluorescence emitted from the ingot upon exposure to the excitation light and generating an electric signal representing a number of photons of only light whose wavelength is in an infrared radiation range, of the detected fluorescence.

7 Claims, 5 Drawing Sheets

DETECTING APPARATUS

BACKGROUND OF THE INVENTION

Field of the Invention

The present invention relates to a detecting apparatus for use in specifying regions having different impurity concentrations in an ingot.

Description of the Related Art

Generally, semiconductor device chips are manufactured from disk-shaped wafers. Such wafers are produced as slices that are cut from a cylindrical semiconductor ingot by a wire saw. However, the process of slicing wafers from a semiconductor ingot is problematic in that it is not economical as most of the ingot is lost as a kerf loss, i.e., a cut margin.

Single crystal of silicon carbide (SiC) for use as a power device material are of high hardness. Therefore, the process of slicing wafers from an ingot made of a single crystal of SiC by using the wire saw is time-consuming and poor in productivity.

In view of the above shortcomings, there has been proposed a process of slicing wafers from an ingot using a laser beam, rather than a wire saw (see, for example, JP 2016-111143A). According to the proposed process, a laser beam having a wavelength that can be transmitted through an ingot is applied to the ingot such that a focused spot of the laser beam is positioned within the ingot.

The laser beam thus applied to the ingot forms peel-off layers in the ingot that include modified layers and cracks extending from the modified layers. When external forces such as ultrasonic vibrations are applied to the ingot with the peel-off layers formed therein, the ingot separates into a wafer from the peel-off layers.

Ingots made of a single crystal of SiC are generally doped with an impurity of nitrogen or the like for making themselves electrically conductive. However, the ingots may not be uniformly doped with such an impurity and may contain a plurality of regions having different impurity concentrations.

For example, regions that are flat at an atomic level, called facet regions, formed in growth of a single crystal of SiC have an impurity concentration higher than other regions, i.e., non-facet regions. The regions having a higher impurity concentration, like facet regions, are higher in refractive index and higher in rate of energy absorption than the non-facet regions.

Consequently, when peel-off layers are formed in an ingot of a single crystal of SiC that contains facet regions according to the above process, the peel-off layers are likely to be formed at irregular positions or heights, resulting in an increased kerf loss.

In view of the above drawbacks, there has been proposed a detecting apparatus for specifying facet regions in an SiC ingot (see, for example, JP 2020-77783A). The proposed detecting apparatus detects luminance of fluorescence that has passed through a bandpass filter that transmits radiation in a wavelength range from 395 nm to 430 nm, of all the fluorescence emitted from the SiC ingot upon exposure to excitation light, and specifies facet regions in the SiC ingot on the basis of whether or not the detected luminance is equal to or higher than a predetermined value.

SUMMARY OF THE INVENTION

The proposed detecting apparatus may suffer problems in that the luminance of fluorescence emitted from particles attached to an ingot is high and the detecting apparatus finds it difficult to accurately specify regions such as facet regions where an impurity concentration is higher in some kinds of ingot.

In view of the above problems, it is an object of the present invention to provide a detecting apparatus that is capable of easily specifying regions in an ingot that have different impurity concentrations, e.g., facet regions and non-facet regions.

The inventors of the present invention have found that regions in an ingot that have different impurity concentrations can easily be specified by detecting numbers of photons of fluorescence in an infrared (IR) range, of all the fluorescence emitted from the ingot upon exposure to excitation light.

In accordance with an aspect of the present invention, there is provided a detecting apparatus for use in specifying regions having different impurity concentrations in an ingot. The detecting apparatus includes an ingot holding unit having a holding surface for holding the ingot thereon, an excitation light source for applying excitation light having a predetermined wavelength to a face side of the ingot held on the holding surface, and a photodetector for detecting fluorescence emitted from the ingot upon exposure to the excitation light and generating an electric signal representing a number of photons of only light whose wavelength is in an infrared radiation range, of the detected fluorescence.

Preferably, the detecting apparatus includes a filter disposed on an optical path between the ingot and the photodetector, in which the filter includes an infrared radiation filter for transmitting only infrared radiation therethrough.

Preferably, the detecting apparatus further includes a storage unit for storing a plurality of coordinate sets representing a plurality of regions included in the face side of the ingot on a coordinate plane parallel to the holding surface and numbers of photons of light whose wavelength is in an infrared radiation range and that is detected by the photodetector upon exposure of the excitation light to the respective regions, in association with each other.

Preferably, the detecting apparatus further includes a processor for controlling a display unit to display an image representing the face side of the ingot and indicating regions of the ingot that have different impurity concentrations on the basis of the coordinate sets and the numbers of photons of the light whose wavelength is in the infrared radiation range, stored in the storage unit in association with each other.

The detecting apparatus according to the present invention detects numbers of photons of only light whose wavelength is in the infrared radiation, of fluorescence emitted from the ingot upon exposure to the excitation light. The detecting apparatus is capable of easily specifying regions of the ingot that have different impurity concentrations, e.g., a facet region and a non-facet region.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1A:
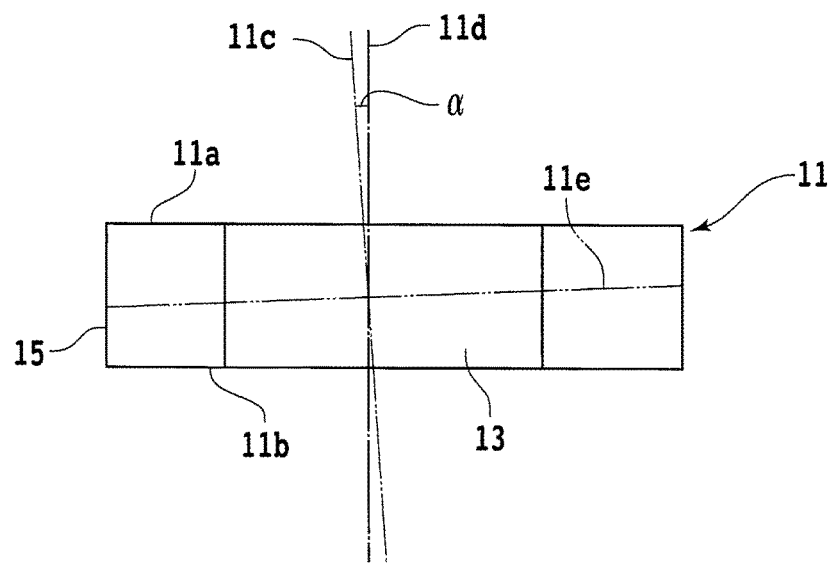
FIG. 1A is a front elevational view schematically illustrating an ingot by way of example.
Figure 1B:
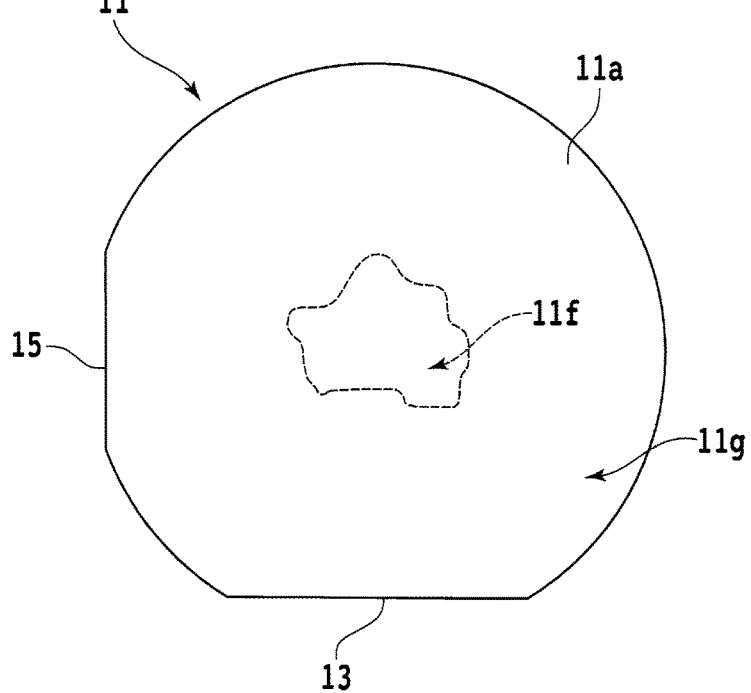
FIG. 1B is a plan view schematically illustrating the ingot.

Preferred embodiment of the present invention will be described below with reference to the accompanying drawings. FIG. 1A schematically illustrates in front elevation an example of an ingot including regions having different impurity concentrations, which can be specified by a detecting apparatus according to an embodiment of the present invention. FIG. 1B schematically illustrates the ingot in plan.

The ingot, denoted by 11 in FIGS. 1A and 1B, is made of a single crystal of SiC and has a cylindrical shape having an upper surface, i.e., a face side, 11a and a lower surface, i.e., a reverse side, 11b that lie generally parallel to each other. The ingot 11 is produced by epitaxial growth such that a c-axis 11c of the single crystal of SiC is slightly inclined to a line 11d normal to the face side 11a and the reverse side 11b.

For example, an angle formed between the c-axis 11c and the line 11d, i.e., an off angle α, is in the range from 1° to 6°, typically 4°. The ingot 11 has two flats indicating the crystal orientation of the single crystal of SiC on its side surface, i.e., a primary orientation flat 13 and a secondary orientation flat 15.

The primary orientation flat 13 is longer than the secondary orientation flat 15. The secondary orientation flat 15 extends parallel to an intersecting line where a plane parallel to a c-plane 11e of the single crystal of SiC and the face side 11a or the reverse side 11b intersect.

Furthermore, the ingot 11 is doped with an impurity of nitrogen or the like for making itself electrically conductive. The ingot 11 contains a facet region 11f that is flat at an atomic level and a non-facet region 11g other than the facet region 11f.

The impurity concentration of the facet region 11f is higher than the impurity concentration of the non-facet region 11g. In FIG. 1B, a boundary line between the facet region 11f and the non-facet region 11g is indicated by the dotted line. However, the boundary line represents a hypothetical line and does not actually exist in the ingot 11.

The material of the ingot 11 is not limited to SiC and may be lithium tantalum (LT; LiTaO$_3$) or gallium nitride (GaN). The ingot 11 may be free of either one or both of the primary orientation flat 13 and the secondary orientation flat 15 on its side surface.

Figure 2:
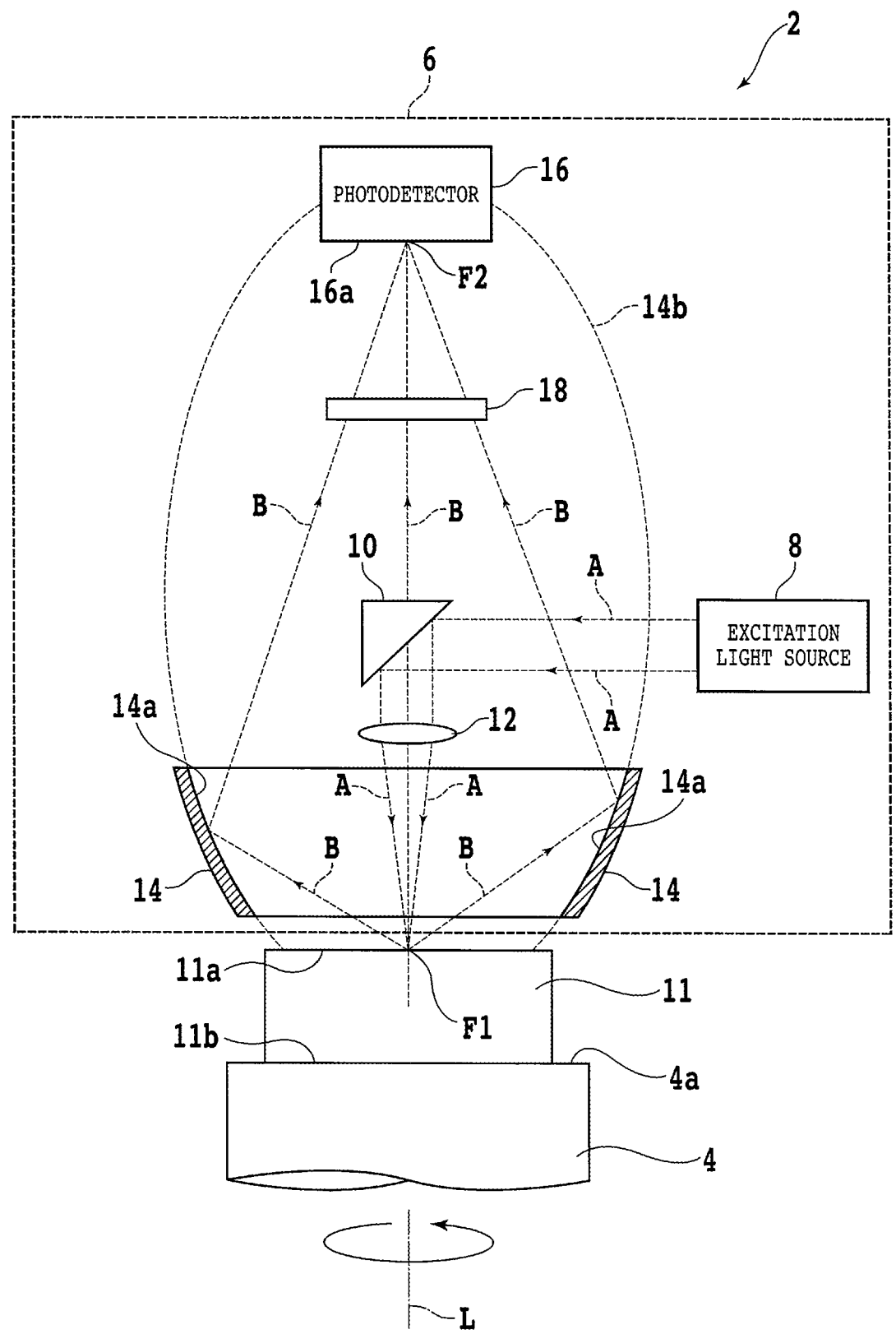
FIG. 2 is a view schematically illustrating a detecting apparatus according to an embodiment of the present invention.

FIG. 2 schematically illustrates the detecting apparatus according to the embodiment of the present invention. In FIG. 2, some of the components of the detecting apparatus are illustrated in block form. The detecting apparatus, denoted by 2 in FIG. 2, has a disk-shaped chuck table, i.e., an ingot holding unit, 4 having an upper surface, i.e., a holding surface, 4a for holding the reverse side 11b of the ingot 11 placed thereon.

The chuck table 4 is coupled to a horizontally moving mechanism, not illustrated, having a ball screw, an electric motor, etc., for example. When the horizontally moving mechanism is actuated, it moves the chuck table 4 in directions parallel to the holding surface 4a, i.e., horizontal directions.

The chuck table 4 is also coupled to a rotating mechanism, not illustrated, having a spindle, an electric motor, etc., for example. When the rotating mechanism is actuated, it rotates the chuck table 4 about a rotational axis represented by a straight line L extending along directions perpendicular to the holding surface 4a, i.e., vertical directions, and passing through a center of the holding surface 4a.

The chuck table 4 is further connected to a suction mechanism, not illustrated, having an ejector or the like, for example. When the suction mechanism is actuated, it applies a negative pressure to the holding surface 4a to hold the ingot 11 placed on the holding surface 4a under suction.

A detecting unit 6 is disposed above the chuck table 4. The detecting unit 6 has an excitation light source 8 having a GaN based light emitter, for example. When energized, the excitation light source 8 emits excitation light A that can be absorbed by the ingot 11, e.g., light having a wavelength of 365 nm, toward a mirror 10 positioned sideways of the excitation light source 8. The excitation light A is reflected by the mirror 10 toward a condensing lens 12 disposed below the mirror 10 and then converged by the condensing lens 12.

The detecting unit 6 also has an annular elliptical mirror 14 having an inner reflecting surface 14a. In FIG. 2, the annular elliptical mirror 14 is illustrated in cross section. The annular reflecting surface 14a is represented by an annular portion of a curved surface of a spheroid generated by revolution of an ellipse 14b about its major axis where the major axis extends vertically and its minor axis extends horizontally.

The elliptical mirror 14 has two focuses F1 and F2 and focuses light emitted from one of the focuses, e.g., the focus F1, to the other focus, e.g., the focus F2. The condensing lens 12 is designed to have its focus coinciding generally with the focus F1. In other words, the excitation light A is converged to the focus F1.

The detecting unit 6 further includes a photodetector 16. The photodetector 16 has a photomultiplier tube or the like that, upon detection of light whose wavelength is 900 nm or lower, for example, outputs an electric signal representing the number of photons of the light. Alternatively, the photodetector 16 may have a photomultiplier tube or the like that, upon detection of light whose wavelength is 1200 nm or 1500 nm or lower, for example, outputs an electric signal representing the number of photons of the light. The photodetector 16 is positioned such that it has a photodetection surface 16a whose center coincides with the focus F2 of the elliptical mirror 14.

In the detecting unit 6, light emitted from the focus F1 and reflected by the elliptical mirror 14 passes through a filter 18 toward the focus F2. Therefore, the filter 18 is disposed on an optical path between the focus F1 and the focus F2 of the elliptical mirror 14. The filter 18 includes an infrared (IR) filter that transmits light whose wavelength is 750 nm or higher and cuts off light whose wavelength is lower than 750 nm, for example.

The detecting unit 6 is coupled to a vertically moving mechanism, not illustrated, having a ball screw, an electric motor, etc., for example. When the vertically moving mechanism is actuated, it moves the detecting unit 6 in vertical directions.

The detecting apparatus 2 specifies regions of the ingot 11 that have different impurity concentrations, e.g., the facet region 11f and the non-facet region 11g, according to the following sequence, for example. First, while the reverse side 11b of the ingot 11 is being held under suction on the holding surface 4a of the chuck table 4, a horizontal position of the chuck table 4 and a vertical position of the detecting unit 6 are adjusted to bring the focus F1 of the elliptical mirror 14 into coincidence with a point on the face side 11a of the ingot 11.

Specifically, the chuck table 4 and the detecting unit 6 are moved relatively to each other so as to bring the focus F1 into coincidence with either one of a plurality of coordinate sets representing a plurality of regions included in the face side 11a of the ingot 11 on a coordinate plane parallel to the holding surface 4a. Then, the excitation light source 8 emits the excitation light A, which is applied to the ingot 11 via the mirror 10 and the condensing lens 12.

When the excitation light A is applied to the ingot 11, the ingot 11 absorbs the excitation light A and emits fluorescence B at the focus F1. If the excitation light A has a wavelength of 365 nm, for example, then the excitation light A enters the ingot 11 from the face side 11a to a depth of approximately 10 μm. The ingot 11 then emits the fluorescence B from a plate-shaped region therein that has a thickness of approximately 10 μm up to the face side 11a of the ingot 11.

The fluorescence B emitted from the ingot 11 at the focus F1 is reflected by the elliptical mirror 14 to reach the filter 18. The filter 18 transmits therethrough only light in an infrared radiation (IR) range, e.g., light having a wavelength of 750 nm or higher, of the fluorescence B.

The photodetector 16 detects the light whose wavelength is in the IR range and generates an electric signal representing the number of photons of the detected light. Then, the excitation light source 8 applies the excitation light A to the ingot 11 each time the chuck table 4 and the detecting unit 6 move relatively to each other to bring the focus F1 into coincidence with each of the remaining ones of the coordinate sets referred to above.

As a result, the photodetector 16 generates as many electric signals, each representing the number of photons of the light whose wavelength is in the IR range, as the number of the coordinate sets. The number of photons of the light from a region of the ingot 11 where the impurity concentration is higher is smaller. Consequently, the detecting apparatus 2 is capable of easily specifying regions of the ingot 11 that have different impurity concentrations, e.g., the facet region 11f and the non-facet region 11g.

The detecting apparatus 2 includes a control unit, not illustrated, for controlling operation of the chuck table 4 and the detecting unit 6. The control unit has, for example, a processor for generating control signals for controlling the chuck table 4 and the detecting unit 6, and a storage unit for storing various pieces of information, e.g., data, programs, etc., used by the processor.

The processor has functions that can be performed by a central processing unit (CPU) or the like that reads and executes programs stored in the storage unit. The storage unit has functions that can be performed by at least one of semiconductor memories including a dynamic random access memory (DRAM), a static random access memory (SRAM), a Not AND (NAND) type flash memory, etc., and magnetic storage devices including a hard disk drive (HDD), etc.

Figure 3:
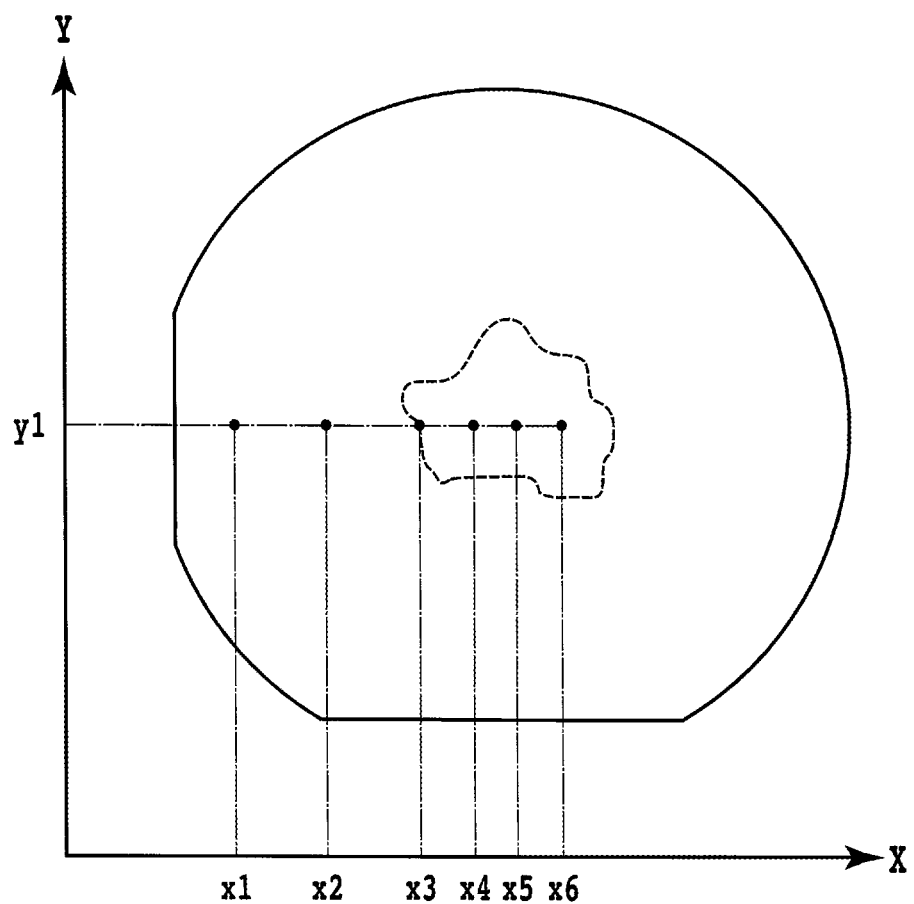
FIG. 3 is a view schematically illustrating an example of a plurality of coordinate sets stored in a storage unit of the detecting apparatus.

The storage unit stores the coordinate sets referred to above and the numbers of photons of the light whose wavelength is in the IR range in association with each other. FIG. 3 schematically illustrates an example of a plurality of coordinate sets stored in the storage unit. Table 1 illustrated below schematically illustrates an example of the numbers (count per second: cps) of photons of the light whose wavelength is in the IR range and that is detected by the photodetector 16 when the excitation light A is applied to each of the regions of the face side 11a of the ingot 11 that are represented by the respective coordinate sets.

TABLE 1

| Coordinate sets | Number of photons (cps) |
|---|---|
| x1, y1 | 5000 |
| x2, y1 | 5000 |
| x3, y1 | 4000 |
| x4, y1 | 2500 |
| x5, y1 | 1000 |
| x6, y1 | 3000 |

The storage unit stores, for example, six coordinate sets (x1, y1), (x2, y1), (x3, y1), (x4, y1), (x5, y1), and (x6, y1) and six numbers of photons (5000 cps), (5000 cps), (4000 cps), (2500 cps), (1000 cps), and (3000 cps) in association with each other.

The detecting apparatus 2 includes a display unit, not illustrated, for displaying an image representing the face side 11a of the ingot 11 and indicating regions of the ingot 11 that have different impurity concentrations, e.g., facet regions and non-facet regions. The display unit is controlled in operation by the processor of the control unit.

Specifically, the processor controls the display of an image on the display unit on the basis of the coordinate sets and the numbers of photons of the light whose wavelength is in the IR range that are stored in the storage unit in association with each other. For example, the processor establishes colors depending on the numbers of photons of the light whose wavelength is in the IR range that are stored in the storage unit and generates an image of the face side 11a of the ingot 11 where the regions of the face side 11a represented by the coordinate sets are rendered in the established colors.

Figure 4:
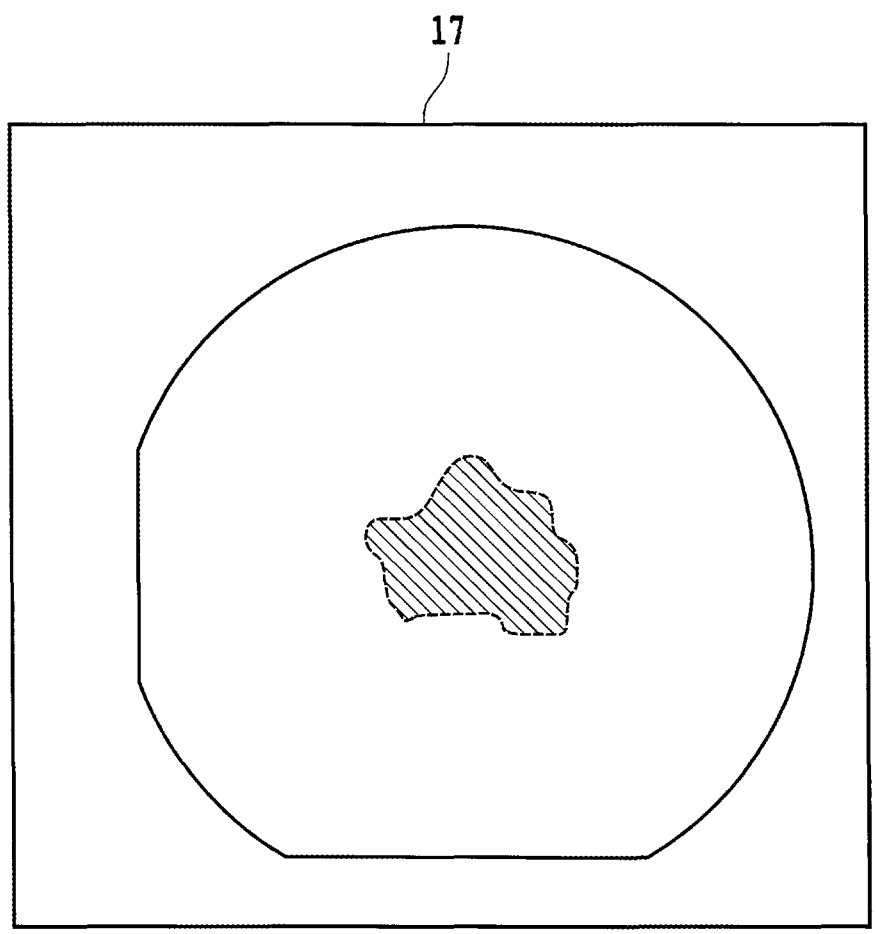
FIG. 4 is a view schematically illustrating an example of an image displayed on a display unit of the detecting apparatus.

FIG. 4 schematically illustrates an example of an image displayed on the display unit. In FIG. 4, a region where the number of photons is smaller, e.g., a facet region, is illustrated by hatching with oblique lines. The detecting apparatus 2 allows an operator to specify with ease regions of the ingot 11 that have different impurity concentrations, e.g., the facet region 11f and the non-facet region 11g, by viewing the image denoted by 17 in FIG. 4. In addition, the detecting apparatus 2 allows the operator to confirm whether or not the photodetector 16 is operating normally by viewing an image, displayed on the display unit, of the face side 11a of the ingot 11 where regions having different impurity concentrations have already been specified.

The detecting apparatus 2 according to the above embodiment is illustrated by way of example only, and the present invention is not limited to the illustrated detecting apparatus 2. The principles of the present invention are applicable to detecting apparatuses of any of various other configurations insofar as they can detect only light whose wavelength is in the IR range, of all the fluorescence emitted from an ingot. For example, the detecting apparatus 2 may lack the filter 18 as long as the photodetector 16 is able to output an electric signal representing the number of photons of only light whose wavelength is in the IR range when not only light whose wavelength is in the IR range but also light whose wavelength is shorter are applied to the photodetection surface 16a.

Figure 5:
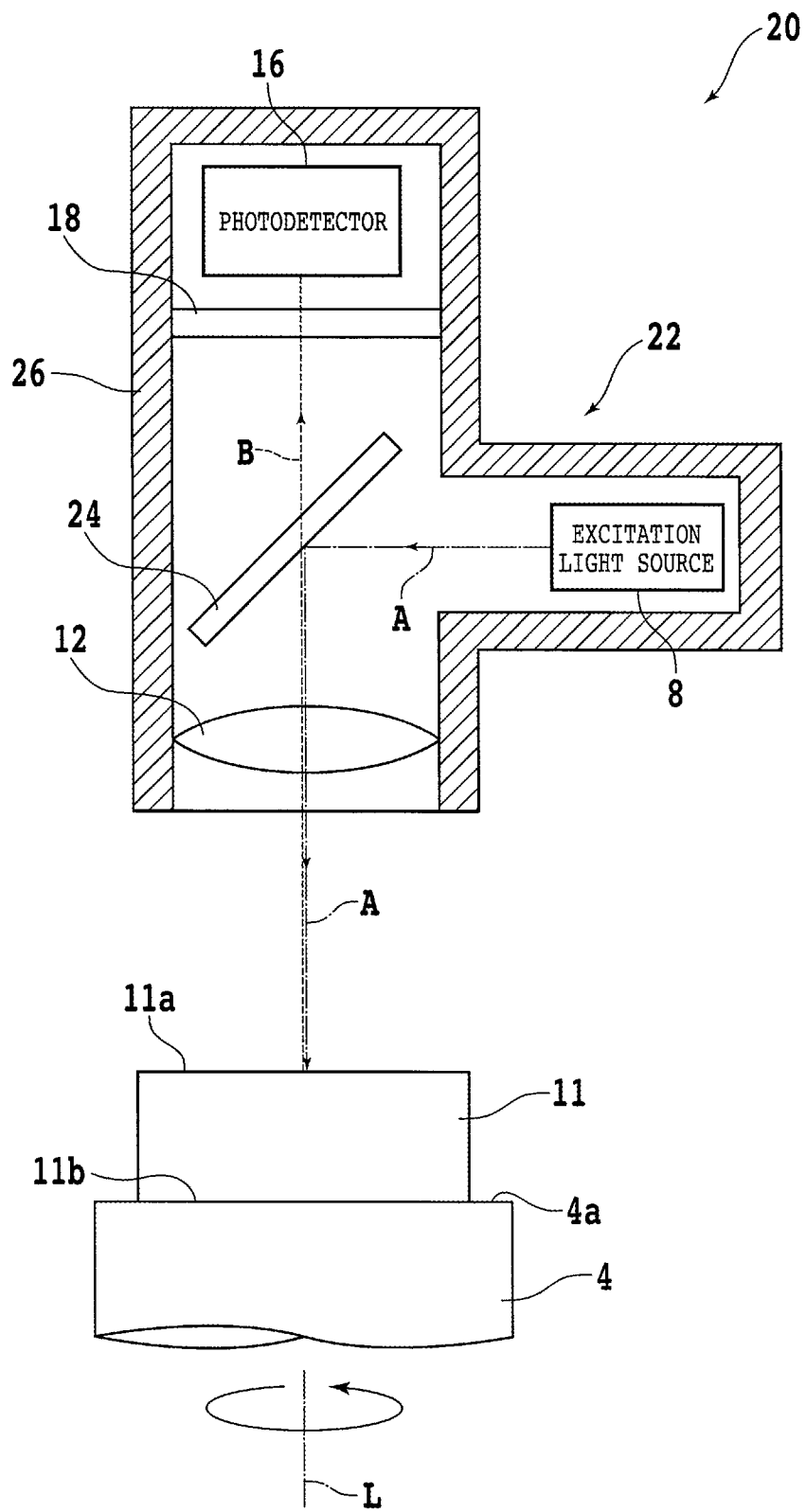
FIG. 5 is a view schematically illustrating a detecting apparatus according to a modification.

The detecting apparatus according to the present invention may include a detecting unit that is different from the detecting unit 6. FIG. 5 schematically illustrates a detecting apparatus 20 according to a modification, having a detecting unit that is different from the detecting unit 6. In FIG. 5, some of the components of the detecting apparatus 20 are illustrated in block form. Those components illustrated in FIG. 5 that are identical to those of the detecting apparatus 2 will be omitted from description below.

The detecting apparatus 20 illustrated in FIG. 5 has a disk-shaped chuck table 4 having an upper surface, i.e., a holding surface, 4a for holding the reverse side 11b of the ingot 11 placed thereon. A detecting unit 22 is disposed above the chuck table 4. The detecting unit 22 has an excitation light source 8.

The excitation light source 8 emits excitation light A toward a dichroic mirror 24 positioned sideways of the excitation light source 8. The dichroic mirror 24 reflects the excitation light A, e.g., light having a wavelength of 365 nm. Light whose wavelength is in the IR range, e.g., light having a wavelength of 750 nm or higher, is transmitted through the dichroic mirror 24. The excitation light A reflected by the dichroic mirror 24 is converged by the condensing lens 12.

The detecting unit 22 has a filter 18 positioned between the dichroic mirror 24 and a photodetector 16 disposed above the dichroic mirror 24. The components described above of the detecting unit 22 are housed in a case 26 having an opening that is positioned below the condensing lens 12 and that is open downwardly.

The case 26 has its walls made of a material that cuts off light whose wavelength is in the IR range. Therefore, the photodetector 16 detects only light whose wavelength is in the IR range and that has passed through the condensing lens 12, the dichroic mirror 24, and the filter 18.

The detecting unit 22 is coupled to a vertically moving mechanism, not illustrated, having a ball screw, an electric motor, etc., for example. When the vertically moving mechanism is actuated, it moves the detecting unit 22 in vertical directions.

The detecting apparatus 20 specifies regions of the ingot 11 that have different impurity concentrations, e.g., the facet region 11f and the non-facet region 11g, according to the following sequence, for example. First, while the reverse side 11b of the ingot 11 is being held under suction on the holding surface 4a of the chuck table 4, the horizontal position of the chuck table 4 and the vertical position of the detecting unit 22 are adjusted to bring the focused spot of the excitation light A into coincidence with a point on the face side 11a of the ingot 11.

Specifically, the chuck table 4 and the detecting unit 22 are moved relatively to each other so as to bring the focused spot of the excitation light A into coincidence with either one of a plurality of coordinate sets indicating a plurality of regions included in the face side 11a of the ingot 11 on a coordinate plane parallel to the holding surface 4a. Then, the simulating light source 8 emits the excitation light A, which is applied to the ingot 11 via the dichroic mirror 24 and the condensing lens 12.

When the excitation light A is applied to the ingot 11, the ingot 11 absorbs the excitation light A and emits fluorescence B. The fluorescence B emitted from the ingot 11 travels through the condensing lens 12 and the dichroic mirror 24 and reaches the filter 18. The filter 18 transmits therethrough only light whose wavelength is in the IR range, e.g., light having a wavelength of 750 nm or higher, of the fluorescence B.

The photodetector 16 detects the light whose wavelength is in the IR range and generates an electric signal representing the number of photons of the detected light. Then, the excitation light source 8 applies the excitation light A to the ingot 11 each time the chuck table 4 and the detecting unit 22 move relatively to each other to bring the focused spot of the excitation light A into coincidence with each of the remaining ones of the coordinate sets referred to above.

As a result, the photodetector 16 generates as many electric signals, each representing the number of photons of the light whose wavelength is in the IR range, as the number of the coordinate sets. Consequently, the detecting apparatus 20 is capable of easily specifying regions of the ingot 11 that have different impurity concentrations, e.g., the facet region 11f and the non-facet region 11g, as with the detecting apparatus 2 illustrated in FIG. 2.

Structural details, method details, and other details according to the above embodiment and modifications of the present invention may be appropriately changed or modified without departing from the scope of the invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A detecting apparatus for use in specifying regions having different impurity concentrations in an ingot, comprising:
    an ingot holding unit having a holding surface for holding the ingot thereon; an excitation light source for applying excitation light having a predetermined wavelength to a face side of the ingot held on the holding surface;
    an annular elliptical mirror having a curved inner reflecting surface that reflects fluorescence emitted from the ingot upon exposure to the excitation light; and
    a photodetector for detecting the fluorescence reflected from the curved inner reflecting surface of the annular elliptical mirror and generating an electric signal representing a number of photons of only light whose wavelength is in an infrared radiation range, of the detected fluorescence.

2. The detecting apparatus according to claim 1, further comprising:
    a filter disposed on an optical path between the ingot and the photodetector, wherein
    the filter includes an infrared radiation filter for transmitting only infrared radiation therethrough.

3. The detecting apparatus according to claim 1, further comprising:
    a storage unit for storing a plurality of coordinate sets representing a plurality of regions included in the face side of the ingot on a coordinate plane parallel to the holding surface and numbers of photons of light whose wavelength is in the infrared radiation range and that is detected by the photodetector upon exposure of the excitation light to the respective regions, in association with each other.

4. The detecting apparatus according to claim 3, further comprising:
    a processor for controlling a display unit to display an image representing the face side of the ingot and indicating regions of the ingot that have different impurity concentrations on the basis of the coordinate sets and the numbers of photons of the light whose wavelength is in the infrared radiation range, stored in the storage unit in association with each other.

5. The detecting apparatus according to claim 2, further comprising:
   a storage unit for storing a plurality of coordinate sets representing a plurality of regions included in the face side of the ingot on a coordinate plane parallel to the holding surface and numbers of photons of light whose wavelength is in the infrared radiation range and that is detected by the photodetector upon exposure of the excitation light to the respective regions, in association with each other.

6. The detecting apparatus according to claim 5, further comprising:
   a processor for controlling a display unit to display an image representing the face side of the ingot and indicating regions of the ingot that have different impurity concentrations on the basis of the coordinate sets and the numbers of photons of the light whose wavelength is in the infrared radiation range, stored in the storage unit in association with each other.

7. The detecting apparatus according to claim 2, wherein the infrared radiation filter of the filter transmits light having a wavelength of 750 nm or higher.

* * * * *